United States Patent
Blaylock et al.

(10) Patent No.: US 12,286,077 B1
(45) Date of Patent: Apr. 29, 2025

(54) TRAILER HITCH STEP

(71) Applicant: TEMCo Industrial, LLC, Fremont, CA (US)

(72) Inventors: Bryan C. Blaylock, San Jose, CA (US); Josh L. Leber, Fremont, CA (US)

(73) Assignee: TEMCo INDUSTRIAL, LLC, Brenham, TX (US)

( * ) Notice: Subject to any disclaimer, the term of this patent is extended or adjusted under 35 U.S.C. 154(b) by 347 days.

(21) Appl. No.: 18/101,176

(22) Filed: Jan. 25, 2023

Related U.S. Application Data

(60) Provisional application No. 63/308,193, filed on Feb. 9, 2022.

(51) Int. Cl.
*B60R 3/00* (2006.01)
*B60D 1/52* (2006.01)

(52) U.S. Cl.
CPC ............... *B60R 3/007* (2013.01); *B60D 1/52* (2013.01)

(58) Field of Classification Search
CPC .. B60R 3/007; B60R 9/06; B60D 1/52; B60D 1/58; B60D 1/66; B21D 5/04
See application file for complete search history.

(56) References Cited

U.S. PATENT DOCUMENTS

| | | | |
|---|---|---|---|
| 30,545 A * | 10/1860 | Rexford | B21D 5/04 72/323 |
| 430,835 A * | 6/1890 | Codding | B21D 5/04 72/323 |
| D372,447 S * | 8/1996 | McCoy | D12/162 |
| 5,735,539 A * | 4/1998 | Kravitz | B60D 1/52 280/491.2 |
| 6,010,143 A * | 1/2000 | Stein | B60D 1/145 24/514 |

(Continued)

FOREIGN PATENT DOCUMENTS

| | | | |
|---|---|---|---|
| AU | 2021106753 A4 * | 11/2021 | |
| WO | WO-2007118067 A2 * | 10/2007 | A01K 97/10 |

OTHER PUBLICATIONS

Hitch Receive Extension with Step; Internet page by Buyers Products Company; https://www.buyersproducts.com/product/itch-receiver-extension-with-step-6246; retrieved Mar. 6, 2025 (Year: 2023).*

(Continued)

*Primary Examiner* — Steve Clemmons
(74) *Attorney, Agent, or Firm* — Donald J. Ersler

(57) ABSTRACT

A trailer hitch step preferably includes a trailer hitch step platform and a securement yoke. The trailer hitch step platform preferably includes a base tube, a first step, a second step and a retention plate. Each step includes a plate that is notched in a perimeter and then bent over. A rear and bottom of the first and second steps are attached to first and second ends of the base tube. The retention plate includes a securement opening and a receiver opening. A bottom of the retention plate is attached to a top of the base tube. The securement yoke preferably includes a base member and a threaded fastener. The base member includes a base plate and a pair of projections. A clearance notch is formed in one end of the base plate and a threaded tap is formed through an opposing end of the base plate.

14 Claims, 6 Drawing Sheets

(56) References Cited

U.S. PATENT DOCUMENTS

| | | | | |
|---|---|---|---|---|
| 6,105,989 A * | 8/2000 | Linger | | B60D 1/241 |
| | | | | 280/506 |
| 6,145,861 A * | 11/2000 | Willis | | B60D 1/58 |
| | | | | 280/164.2 |
| 6,474,522 B1 * | 11/2002 | Johnson | | B60R 9/06 |
| | | | | 280/491.5 |
| 7,004,491 B1 * | 2/2006 | Allsop | | B60D 1/52 |
| | | | | 280/491.2 |
| 7,661,693 B1 * | 2/2010 | Lipski | | B60R 9/06 |
| | | | | 280/166 |
| 8,844,962 B2 * | 9/2014 | Bernart | | B60D 1/58 |
| | | | | 280/507 |
| 8,960,512 B2 * | 2/2015 | Maenle | | A01B 23/02 |
| | | | | 224/558 |
| 9,266,476 B2 * | 2/2016 | Mendoza | | B60D 1/52 |
| 9,745,006 B2 * | 8/2017 | Pemberton | | B60R 9/06 |
| 9,783,016 B2 * | 10/2017 | Forhan | | B60R 11/06 |
| 10,183,538 B2 * | 1/2019 | Palmer | | B60D 1/52 |
| D851,546 S * | 6/2019 | McCuskey | | D12/162 |
| D881,078 S * | 4/2020 | Rebick | | B60D 1/58 |
| | | | | D12/162 |
| 11,485,431 B2 * | 11/2022 | Mathews | | B62D 43/02 |
| 11,801,792 B2 * | 10/2023 | Spigner | | B60D 1/06 |
| 12,103,343 B1 * | 10/2024 | Rebick | | B60R 3/007 |
| 2006/0214391 A1 * | 9/2006 | Columbia | | B60D 1/07 |
| | | | | 280/491.5 |
| 2006/0284399 A1 * | 12/2006 | Scott | | B60D 1/52 |
| | | | | 280/511 |
| 2010/0294819 A1 | 11/2010 | Spera | | |
| 2012/0313343 A1 * | 12/2012 | Fletcher | | B60D 1/58 |
| | | | | 280/164.1 |

OTHER PUBLICATIONS

Trailer Hitch Ball Mount Step, Part No. 7060200; Internet page by Reese; https://www.reeseprod.com/product/7060200_trailer-hitch-step#product-specification-content; retrieved Mar. 6, 2025 (Year: 2023).*

* cited by examiner

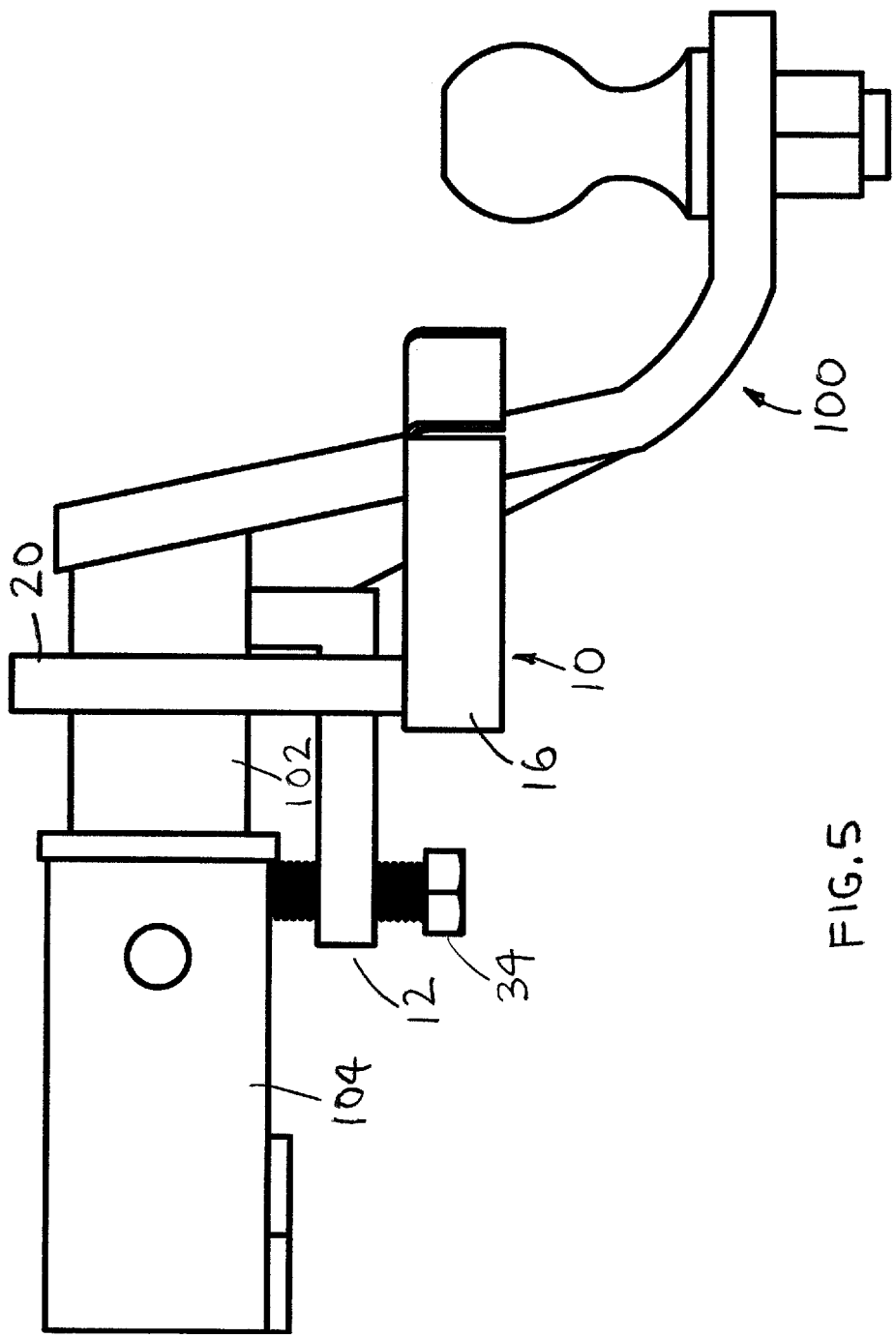

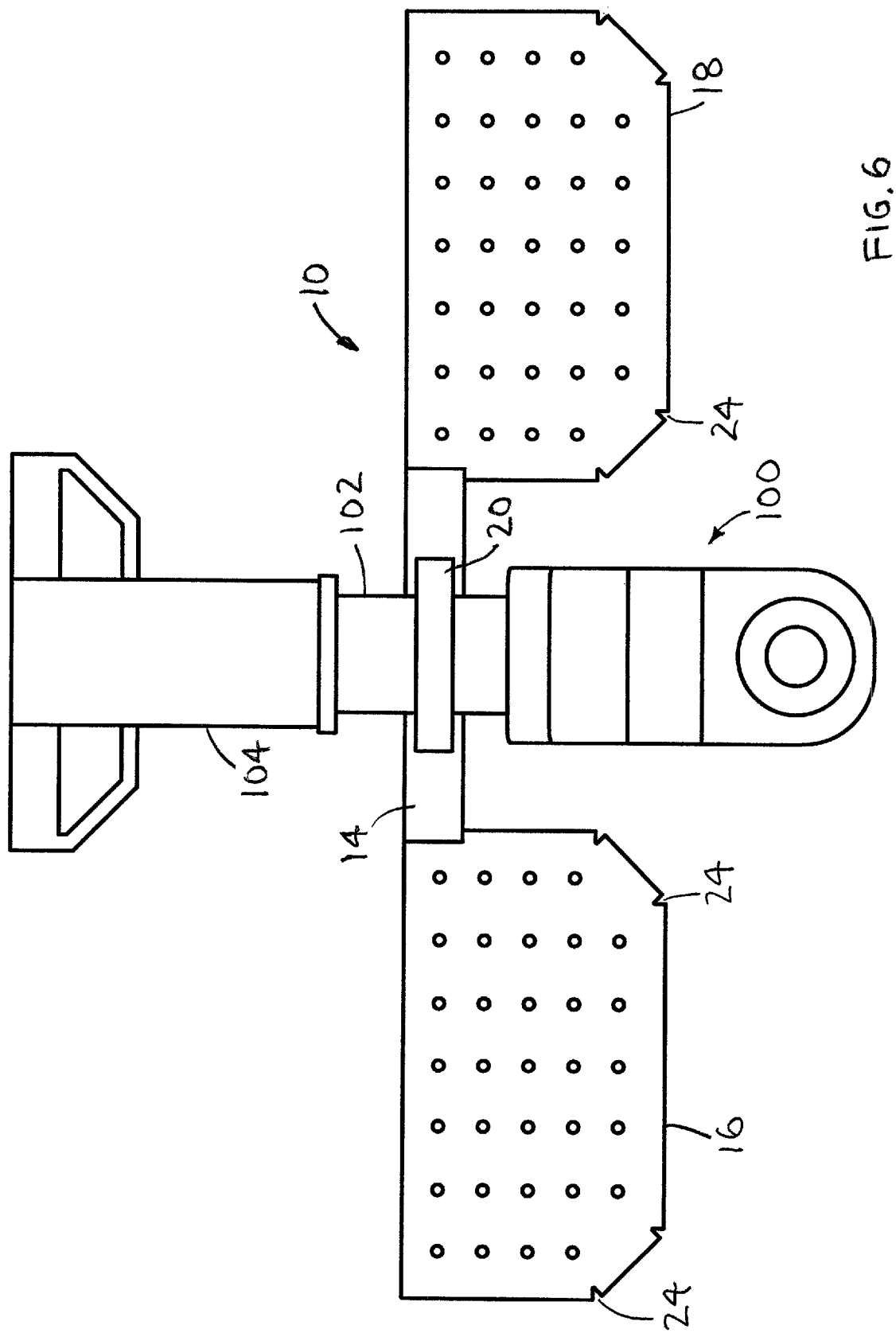

TRAILER HITCH STEP

CROSS-REFERENCES TO RELATED APPLICATIONS

This application claims the benefit of patent application No. 63/308,193, filed on Feb. 9, 2022, which is thereby incorporated by reference in its entirety.

BACKGROUND OF THE INVENTION

1. Field of the Invention

The present invention relates generally to trailers and more specifically to a trailer hitch step, which may be firmly retained on an insertable hitch and a hitch receiver assembly.

2. Discussion of the Prior Art

It appears that the prior art does not teach or suggest a trailer hitch step. Patent publication no. 2010/0294819 to Spera discloses a trailer hitch accessory mounting receiver.

Accordingly, there is a clearly felt need in the art for a trailer hitch step, which may be firmly retained on an insertable hitch and a hitch receiver assembly.

SUMMARY OF THE INVENTION

The present invention provides a trailer hitch step, which may be firmly retained on an insertable hitch and a hitch receiver assembly. The trailer hitch step preferably includes a trailer hitch step platform and a securement yoke. The trailer hitch step platform preferably includes a base tube, a first step, a second step and a retention plate. The first and second steps include a plate that is notched in multiple locations. A perimeter of the first and second steps is then bent over and welded to form a step. A rear and bottom of the first and second steps are attached to first and second ends of the base tube. The retention plate preferably includes a securement opening and a receiver opening. The securement opening is formed, adjacent a bottom of the retention plate and the receiver opening is formed adjacent a top of the retention plate. A separation space is preferably formed between a bottom of the receiver opening and a top of the securement opening. A bottom of the retention plate is attached to a top and middle of the base tube with welding or any other suitable attachment method or device. The securement yoke preferably includes a base member and a threaded fastener. The base member preferably includes a base plate and a pair of projections. A clearance notch is preferably formed in one end of the base plate and a threaded tap is formed through an opposing end of the base plate. The pair of projections extend outward from the one end of the base plate and are positioned on opposing sides of the clearance notch. The threaded fastener is threaded into the threaded tap.

Accordingly, it is an object of the present invention to provide a trailer hitch step, which may be firmly retained on an insertable hitch and a hitch receiver assembly.

These and additional objects, advantages, features and benefits of the present invention will become apparent from the following specification.

BRIEF DESCRIPTION OF THE DRAWINGS

FIG. 5 is a side view of a trailer hitch step retained on a hitch insert and a hitch receiver assembly in accordance with the present invention.

FIG. 6 is a top view of a trailer hitch step retained on a hitch insert and a hitch insert assembly in accordance with the present invention.

DETAILED DESCRIPTION OF THE PREFERRED EMBODIMENTS

Figure 1:
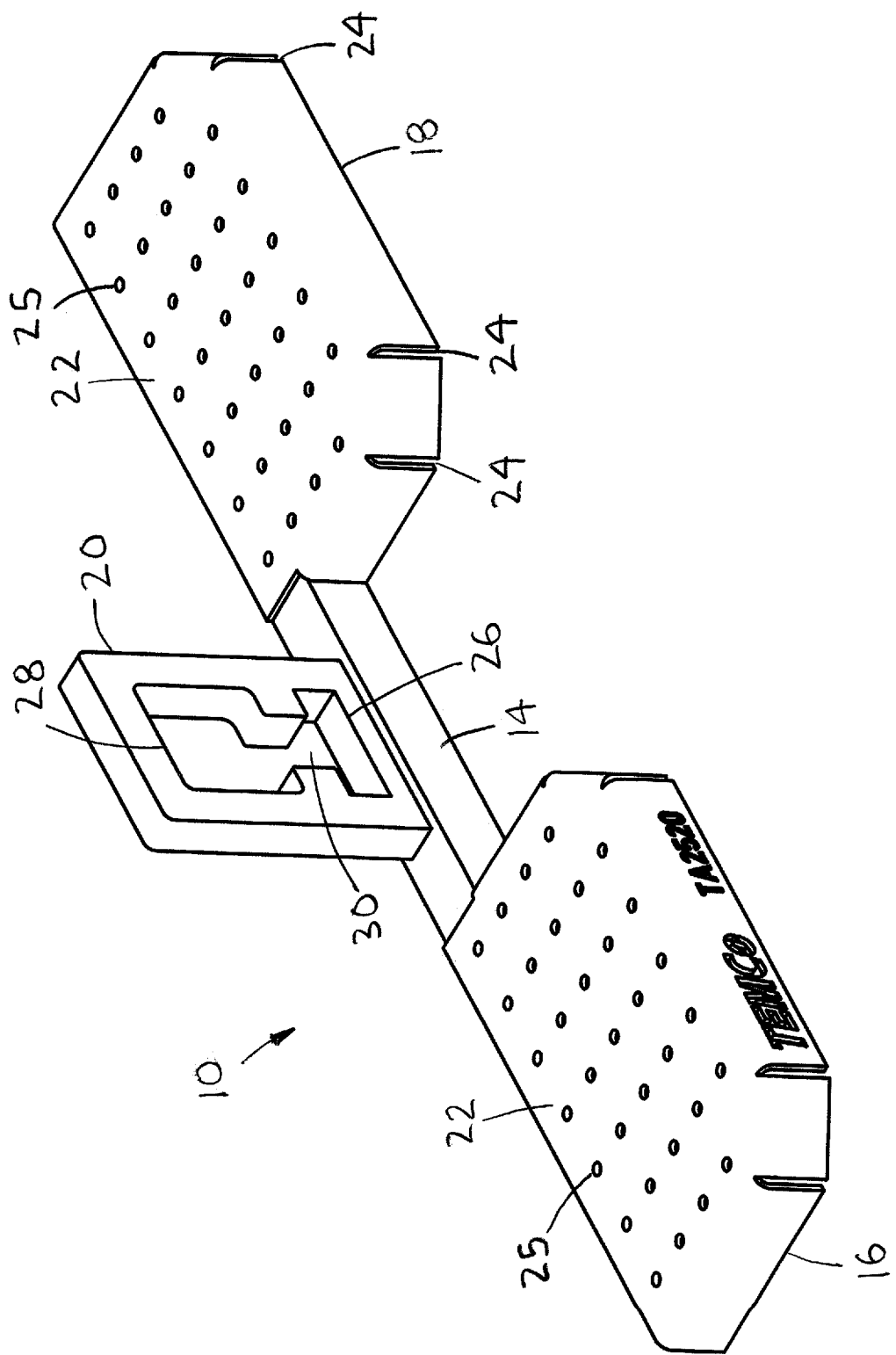
FIG. 1 is a perspective view of a trailer hitch step platform in accordance with the present invention.
Figure 2:
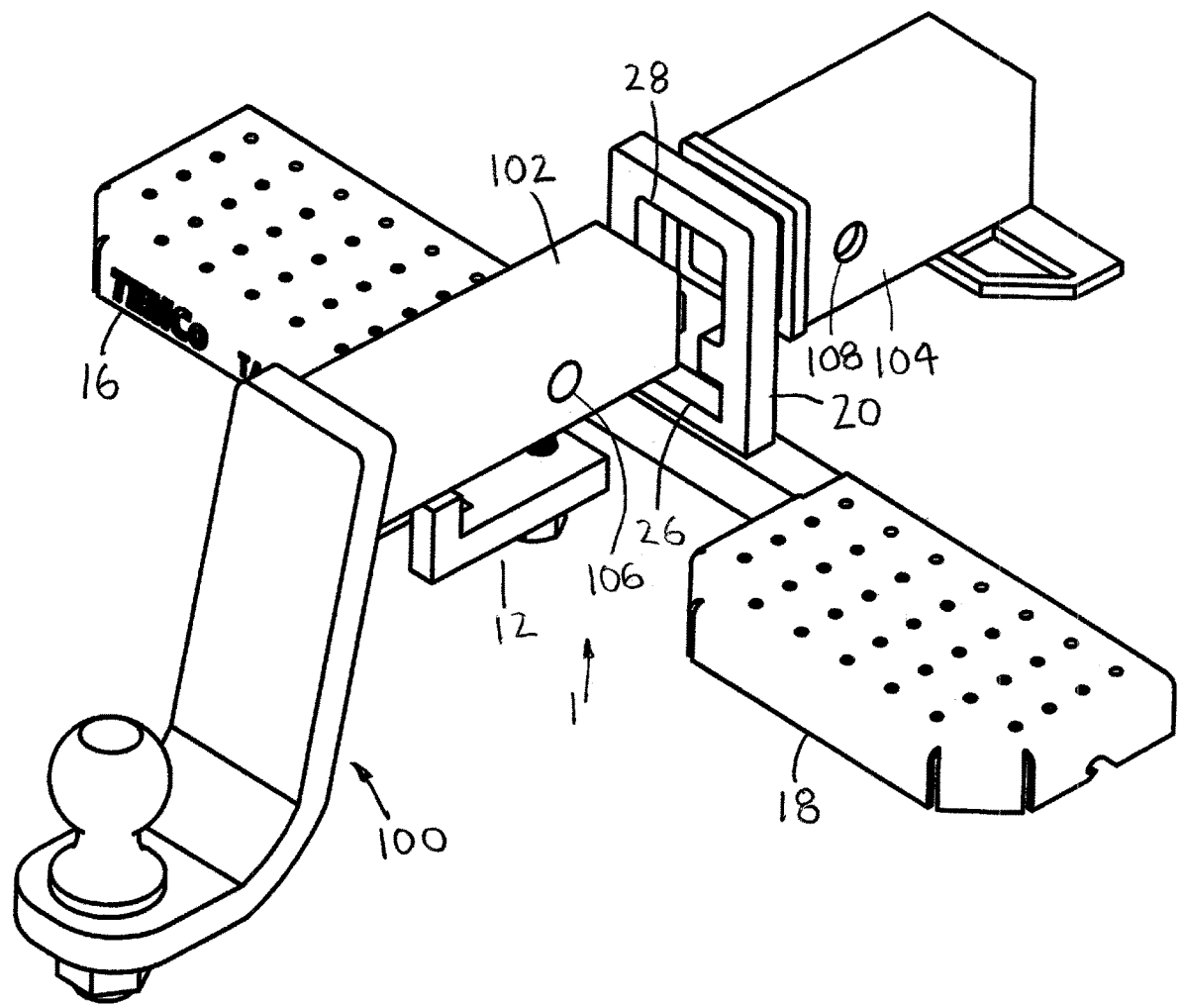
FIG. 2 is a top partially exploded perspective view of a trailer hitch step relative to a hitch receiver and a hitch insert in accordance with the present invention.
Figure 3:
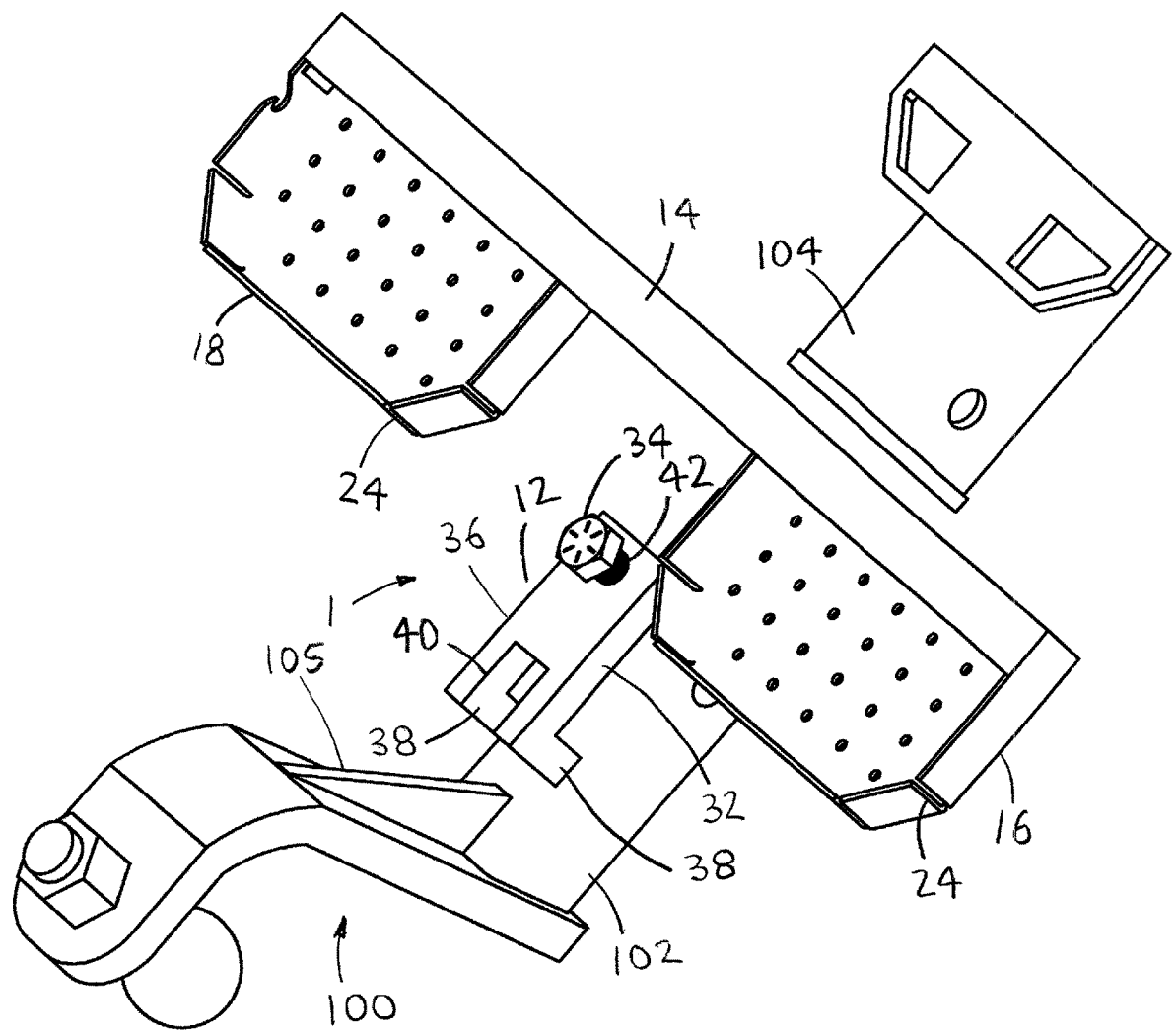
FIG. 3 is a bottom partially exploded perspective view of a trailer hitch step relative to a hitch receiver and a hitch insert in accordance with the present invention.
Figure 4:
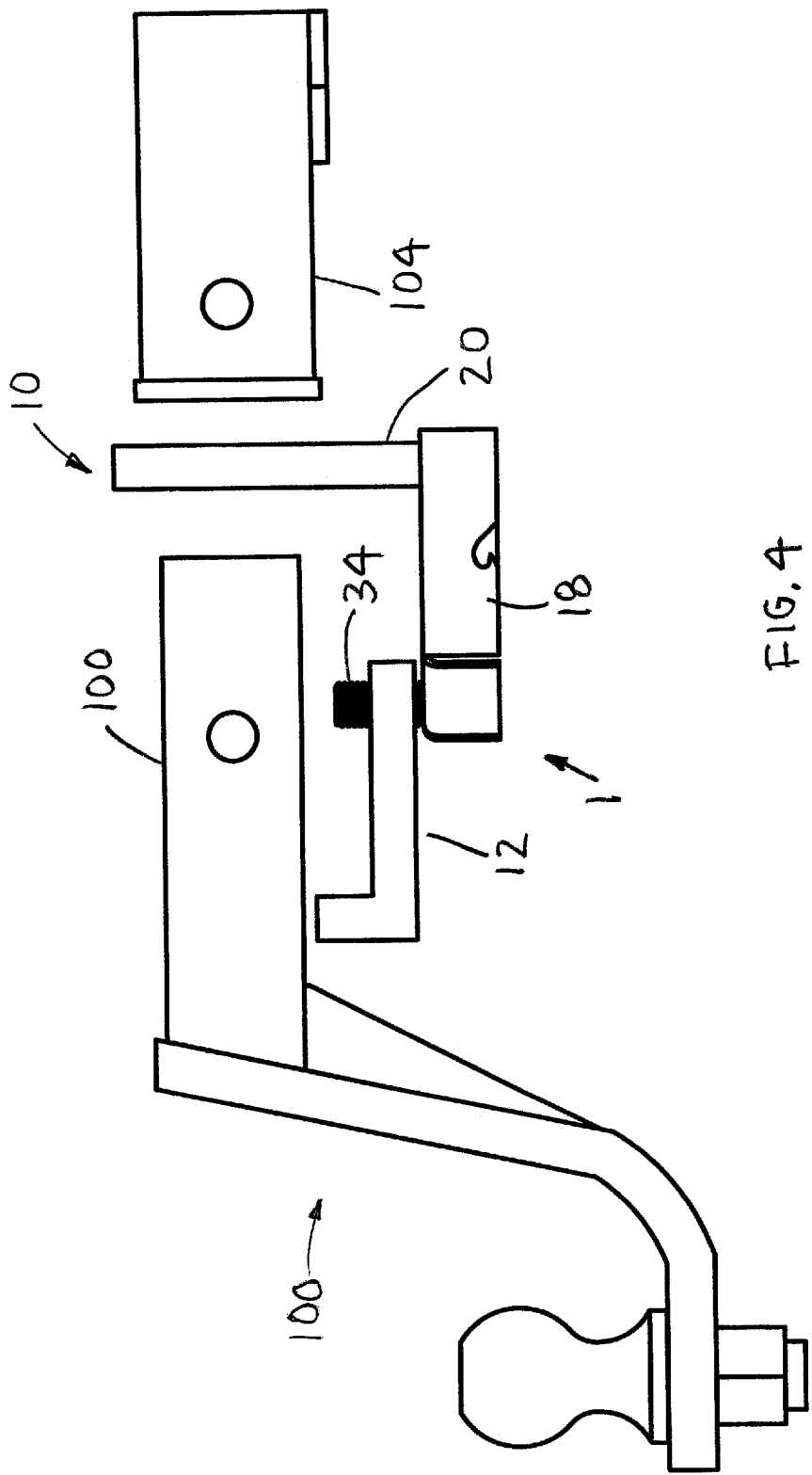
FIG. 4 is a side partially exploded perspective view of a trailer hitch step relative to a hitch receiver and a hitch insert in accordance with the present invention.

With reference now to the drawings, and particularly to FIG. 1, there is shown a perspective view of a trailer hitch step platform 10. With reference to FIGS. 2-6, a trailer hitch step 1 includes the trailer hitch step platform 10 and a securement yoke 12. The trailer hitch step platform 10 preferably includes a base tube 14 (elongated base), a first step 16, a second step 18 and a retention plate 20. The first and second steps 16, 18 are formed from a plate 22. A plurality of bend notches 24 are formed in multiple locations in a perimeter of the plate 22. A plurality of raised projections 25 are also formed in a top of the plate 22 to provide grip between the first and second steps 16, 18 and a shoe. A perimeter of the plate 22 is then bent over to form the first and second steps 16, 18. The notches 24 may be welded to increase the strength of the first and second steps 16, 18. A rear and bottom of the first and second steps 16, 18 are preferably attached to first and second ends of the base tube 14 with welding or any other suitable attachment method or device.

The retention plate 20 includes a securement opening 26 and a receiver opening 28. The securement opening 26 is formed, adjacent a bottom of the retention plate 20 and the receiver opening 28 is formed adjacent a top of the retention plate 20. A separation space 30 is preferably formed between a bottom of the receiver opening 28 and a top of the securement opening 26. The securement opening 26 is sized to receive the securement yoke 12. The receiver opening 28 is sized to receive an insert tube 102 of a hitch insert 100. A bottom of the retention plate 20 is preferably attached to a top and middle of the base tube 14 with welding or any other suitable attachment method or device. The securement yoke 12 preferably includes a base member 32 and a threaded fastener 34. The base member 32 includes a base plate 36 and a pair of projections 38. A clearance notch 40 is formed in one end of the base plate 36 and a threaded tap 42 is formed through an opposing end of the base plate 36. The pair of projections 38 preferably extend outward from a top of the one end of the base plate 36 and are positioned on opposing sides of the clearance notch 40.

In use, the trailer hitch step 1 is installed on a hitch insert 100 and a hitch receiver 104 assembly in the following manner. The base member 32 of the securement yoke 12 is inserted through the securement opening 26 in the retention plate 20, such that the pair of projections 38 are oriented upward. The threaded fastener 34 is then threaded upward into the base member 32. The clearance notch 40 provides clearance for a gusset 105 supporting the hitch insert 100. The insert tube 102 of a hitch insert 100 is inserted through the receiver opening 28. The insert tube 102 is then inserted into the hitch receiver 104. A retention pin (not shown) is inserted through a hitch retention hole 106 in the insert tube 102 and a receiver hole 108 in the hitch receiver 104. The threaded fastener 34 is then tightened to prevent axial movement and wobble of the trailer hitch step platform 10 relative to the hitch insert 102.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

We claim:

1. A trailer hitch step for retention on an insert tube of a hitch insert, comprising:
   an elongated base;
   a first step is retained on a first end of said elongated base;
   a second step is retained on a second end of said elongated base;
   a base member includes a threaded fastener threadably engaged therein; and
   a retention plate extends upward from said elongated base, a securement opening and a receiver opening are formed through said retention plate to receive the insert tube, said securement opening is sized to receive said base member, said receiver opening is sized to receive the insert tube, wherein said threaded fastener is tightened to secure said trailer hitch step to the hitch insert.

2. The trailer hitch step for retention on an insert tube of a hitch insert of claim 1 wherein:
   each one of said first and second steps is fabricated from a plate, a plurality of notches are formed on a portion of a perimeter of said plate, a portion of a perimeter of said plate is bent downward.

3. The trailer hitch step for retention on an insert tube of a hitch insert of claim 2 wherein:
   a plurality of raised projections are formed in a top of said plate to provide grip for a shoe.

4. The trailer hitch step for retention on an insert tube of a hitch insert of claim 1 wherein:
   said elongated base is a tube.

5. A trailer hitch step for retention on an insert tube of a hitch insert, comprising:
   an elongated base;
   a first step is retained on a first end of said elongated base;
   a second step is retained on a second end of said elongated base;
   a securement yoke includes a base member and a threaded fastener, said threaded fastener is retained in one end of said base member; and
   a retention plate extends upward from said elongated base, a securement opening and a receiver opening are formed through said retention plate, said securement opening is sized to receive said base member, said receiver opening is sized to receive the insert tube, wherein said threaded fastener is tightened to secure said trailer hitch insert to the insert tube and a hitch receiver.

6. The trailer hitch step for retention on an insert tube of a hitch insert of claim 5 wherein:
   each one of said first and second steps is fabricated from a plate, a plurality of notches are formed on a portion of a perimeter of said plate, a portion of a perimeter of said plate is bent downward.

7. The trailer hitch step for retention on an insert tube of a hitch insert of claim 6 wherein:
   a plurality of raised projections are formed in a top of said plate to provide grip for a shoe.

8. The trailer hitch step for retention on an insert tube of a hitch insert of claim 5 wherein:
   said elongated base is a tube.

9. The trailer hitch step for retention on an insert tube of a hitch insert of claim 5 wherein:
   said securement yoke includes a clearance notch formed in an opposing end thereof.

10. A trailer hitch step for retention on an insert tube of a hitch insert, comprising:
    an elongated base;
    a first step is retained on a first end of said elongated base;
    a second step is retained on a second end of said elongated base;
    a securement yoke includes a base member and a threaded fastener, said threaded fastener is retained in one end of said base member, at least one projection extends outward from an opposing end; and
    a retention plate extends upward from said elongated base, a securement opening and a receiver opening are formed through said retention plate, said securement opening is sized to receive said base member, said receiver opening is sized to receive the insert tube, wherein said threaded fastener is tightened to secure said trailer hitch insert to the insert tube and a hitch receiver.

11. The trailer hitch step for retention on an insert tube of a hitch insert of claim 10 wherein:
    each one of said first and second steps is fabricated from a plate, a plurality of notches are formed around a portion of a perimeter of said plate, a portion of a perimeter of said plate is bent downward.

12. The trailer hitch step for retention on an insert tube of a hitch insert of claim 11 wherein:
    a plurality of raised projections are formed in a top of said plate to provide grip for a shoe.

13. The trailer hitch step for retention on an insert tube of a hitch insert of claim 10 wherein:
    said elongated base is a tube.

14. The trailer hitch step for retention on an insert tube of a hitch insert of claim 10 wherein:
    said securement yoke includes a clearance notch formed in said opposing end thereof.

* * * * *